United States Patent [19]

Champoux et al.

[11] Patent Number: 4,524,600
[45] Date of Patent: Jun. 25, 1985

[54] APPARATUS FOR PRESTRESSING FASTENER HOLES

[76] Inventors: Robert L. Champoux, 2539 128th SE., Bellevue, Wash. 98005; Charles M. Copple, 13713 SE. 237th Pl., Kent, Wash. 98031

[21] Appl. No.: 574,011

[22] Filed: Jan. 26, 1984

Related U.S. Application Data

[62] Division of Ser. No. 347,717, Feb. 10, 1982, Pat. No. 4,471,643.

[51] Int. Cl.³ .............................................. B21D 31/00
[52] U.S. Cl. ........................................ 72/391; 72/370; 29/446
[58] Field of Search ............... 72/391, 453.17, 453.19, 72/129, 392, 370; 29/243.53, 243.52

[56] References Cited

U.S. PATENT DOCUMENTS 3,566,662  3/1971  Champoux ........................... 72/392
3,875,649  4/1975  King, Jr. ................................ 72/391
3,892,121  7/1975  Champoux et al. .............. 29/243.52

Primary Examiner—Daniel C. Crane
Assistant Examiner—David B. Jones
Attorney, Agent, or Firm—Eugene O. Heberer

[57] ABSTRACT

A pull gun (10) is used for pulling a mandrel (12, 150, 180) through an expandable sleeve (74, 144, 180) positioned in a fastener hole. The mandrel expands the sleeve as it moves therethrough causing the sleeve to put the metal which surrounds the hole in a state of compression. The pull gun has alternative extensions or sleeve retainers having general appearances of collet chucks and they are adapted to be positioned adjacent holes being prestressed. The retainers are of relatively small diameter for operation through a drill fixture and in small spaces on a workpiece.

7 Claims, 9 Drawing Figures

APPARATUS FOR PRESTRESSING FASTENER HOLES

This is a division of application Ser. No. 06/347,717, filed Feb. 10, 1982, now U.S. Pat. No. 4,471,643, Sept. 18, 1984.

DESCRIPTION

1. Technical Field

This invention relates to a method and apparatus for prestressing fastener holes.

2. Background Art

In the prior art, pulling guns for retracting a mandrel through a hole being prestressed are of large diameter relative to the size of the fastener holes and are made for operating in contact with a workpiece having the hole being prestressed. In many situations, multiple holes, that are going to be prestressed, are drilled through drill bushings in a drill fixture temporarily secured in front of the workpiece. Because reaming is performed after prestressing, it is very desirable to leave the fixture in place for the reaming, but this is not possible when the large diameter prior art prestressing tools are used.

In addition there are proturbances adjacent to some fastener holes so as to prevent access of the relatively large pull gun to the workpiece at such holes.

The basic patent relating to prestressing or cold-expansion of fastener holes, by use of a lubricated spacing sleeve, is U.S. Pat. No. 3,566,662, granted Mar. 2, 1971 to Louis A. Champoux, and entitled Coldworking Method And Apparatus. A Method And Apparatus For Making Sleeves is disclosed in U.S. Pat. No. 3,665,744, granted May 30, 1972 to Clair M. Harter. It should be noted that there also are prestressing sleeves in use that are not split. U.S. Pat. No. 3,892,121, granted July 1, 1975, to Louis A. Champoux, Horace E. Hill and Joseph L. Phillips, and entitled Apparatus For Cold-Working Holes, discloses a form of mandrel and mandrel pulling tool and gun. U.S. Pat. No. 4,187,708, granted Feb. 12, 1980, to Louis A. Champoux entitled Pulling Apparatus And Method, discloses a preferred form of pull gun.

The aforementioned patents, the references cited against them, and a paper by Joseph L. Phillips, entitled "Fatigue Improvement By Sleeve Coldworking", should be carefully considered for the purpose of putting the present invention into proper perspective relative to the prior art.

DISCLOSURE OF THE INVENTION

The present invention provides an apparatus and method of prestressing fastener holes in a workpiece wherein the holes have been drilled through a drill bushing in a drill fixture temporarily secured in front of the workpiece. Multiple drill bushings in the fixture are used to guide the drill so as to position all of the holes in the current locations. The present invention permits the prestressing through the individual drill bushings and permits the reaming after the prestressing through the same drill bushings without removing the fixture until all of the operations on the holes have been completed. The completion of the operations with the fixture in place is particularly desirable where close tolerances are required. Without the present invention, it would be necessary to drill and ream the holes with the drill fixture in position. The fixture would then be removed for the prestressing operation, and then it would be replaced for the final reaming operation.

The present invention eliminates the requirement for removing the fixture for prestressing by the provision of a relatively small diameter nose piece or sleeve retainer at the prestressing end of the pull gun. In one embodiment, the retainer is adapted to be extended through each drill bushing to be positioned against the workpiece around a fastener hole being prestressed. A mandrel extends through the retainer during the prestressing operation. The mandrel is retracted through the retainer, the retainer being adapted to retain a spacing, internally lubricated sleeve within the fastener hole.

The lubricated sleeve has a flared end which fits into a recess in a flat outer end of the pull gun sleeve retainer and in addition the retainer is made so that it fits tightly but slidably on the mandrel so that the lubricated sleeve cannot slide on the mandrel and into the small diameter nose piece retainer according to the invention.

A pull gun, as disclosed in U.S. Pat. No. 4,187,708, is adapted to receive a retainer or extension according to the invention so that the aforesaid gun can be operated in the same manner as described in the patent.

One sleeve retaining nose piece, as used in the apparatus and method according to the invention, has the general appearance of a collet chuck, but not the function, and has an elongated generally cylindrical portion having an outer substantially flat end with a recess therein surrounding the end of a passageway extending through the retainer. At the inner end of the retainer there is a continuous circumferential portion terminating in an annular flange so as to provide a strong supporting member and to facilitate retention of the extension in the pull gun.

The retainer is made from unhardened ultra high strength alloy steel. A multiple number of axially directed slots are cut into the cylindrical wall of the retainer radially outwardly of the passageway and extending inwardly from the outer end. The slots are terminated adjacent the inner end outwardly of the retention flange. An axially directed finger is thus formed between each pair of adjacent slots. To prepare the retainer for heat treating, an annular clamping device, such as a ring, is fitted over the outer cylindrical end of the retainer so as to move the axially directed surfaces of each slot into contact adjacent the outer end, and thereby form slits at the outer portion of the respective slots.

The retainer is then heat treated in the conventional manner and quenched. After the clamping means is removed, the heat treated extension retains its clamped position with narrow slits at the outer ends, having their axial surfaces normally in contact, and the fingers functioning as axially outwardly tapering, relatively stiff springs, biased radially inwardly.

With the above retainer, having an outer flat nose, the load is transferred through the workpiece directly onto the nose end. The flat end configuration has a very high load transfer through the relatively small diameter that almost always leaves some form of a mark on the workpiece. Such marks are considered to be undesirable on the skin of an aircraft, for example, particularly where they may be seen on an exterior surface. In order to avoid the foregoing marking problem with the present invention, another embodiment of the invention is provided in which an extension nose piece or retainer has a conical outer end, sized so as to fit inside the flare on the end of a lubricated sleeve. Thus, when the mandrel is drawn through the sleeve, the load is transferred directly through the periphery of the fastener hole. The advantage of this embodiment is that it does not leave any marks on the workpiece.

The structure and the means for manufacture of the conical-ended sleeve retainer are substantially the same as that of the first mentioned retainer having the flat outer end, the difference being generally only in the end configuration.

By having small diameter sleeve retainers extending outwardly from the pulling gun, the present invention presents the additional advantage of being adapted for prestressing of holes on workpieces that have protuberances that would prevent the application of a relatively large diameter prior art pulling gun and nose piece from being used because it could not be positioned against the workpiece because of the protuberances. Thus, the relatively small diameter nose piece or sleeve retainer, which is insertable through drill bushings in the drill fixture, is also available for engaging the workpiece where only a small space thereon is available for making contact with the retainer around the holes to be prestressed.

Both embodiments may be comprised of an elongated retainer nose piece which is made of a single piece of metal and is threadedly engaged at its inner end to the outer end of the gun. The outer end of the elongated nose piece has a small diameter as discussed above.

The single piece retainer nose piece provides for the use of a mandrel extension which is secured to the end of the gun at its inner end and extends into the retainer, having a mandrel secured to its outer end. The mandrel extends through the retainer outer passage and in the sleeve in the same manner as described above.

Further advantages of the invention may be brought out in the following part of the specification wherein small details have been described for the competance of disclosure, without intending to limit the scope of the invention which is set forth in the appended claims.

BRIEF DESCRIPTION OF THE DRAWINGS

Referring to the accompanying drawings, which are for illustrative purposes.

BEST MODE OF THE INVENTION

Figure 1:
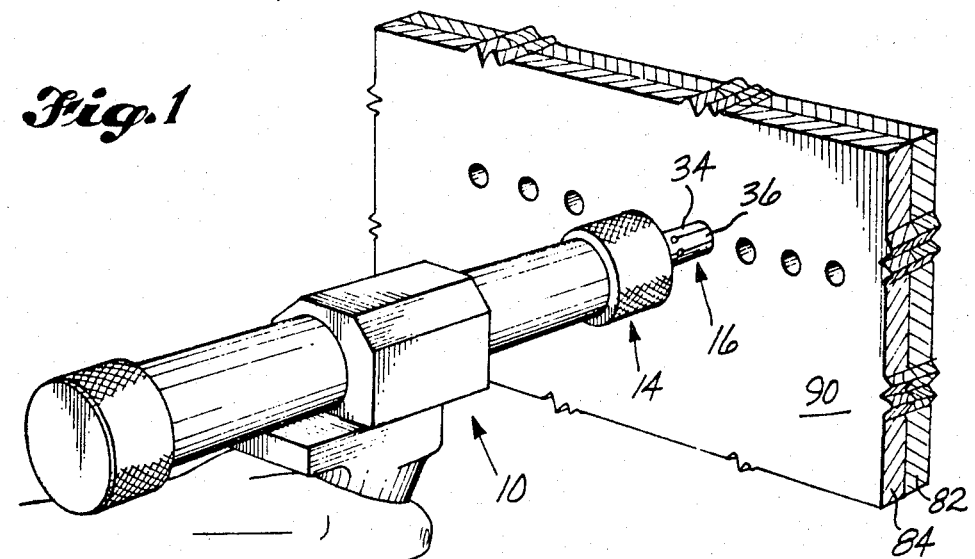
FIG. 1 is a pictorial view of the invention with a sleeve retainer or extension being held against the workpiece and an unshown mandrel extending through a fastener hole, the mandrel being in position for retraction into the extension and the pulling gun.
Figure 2:
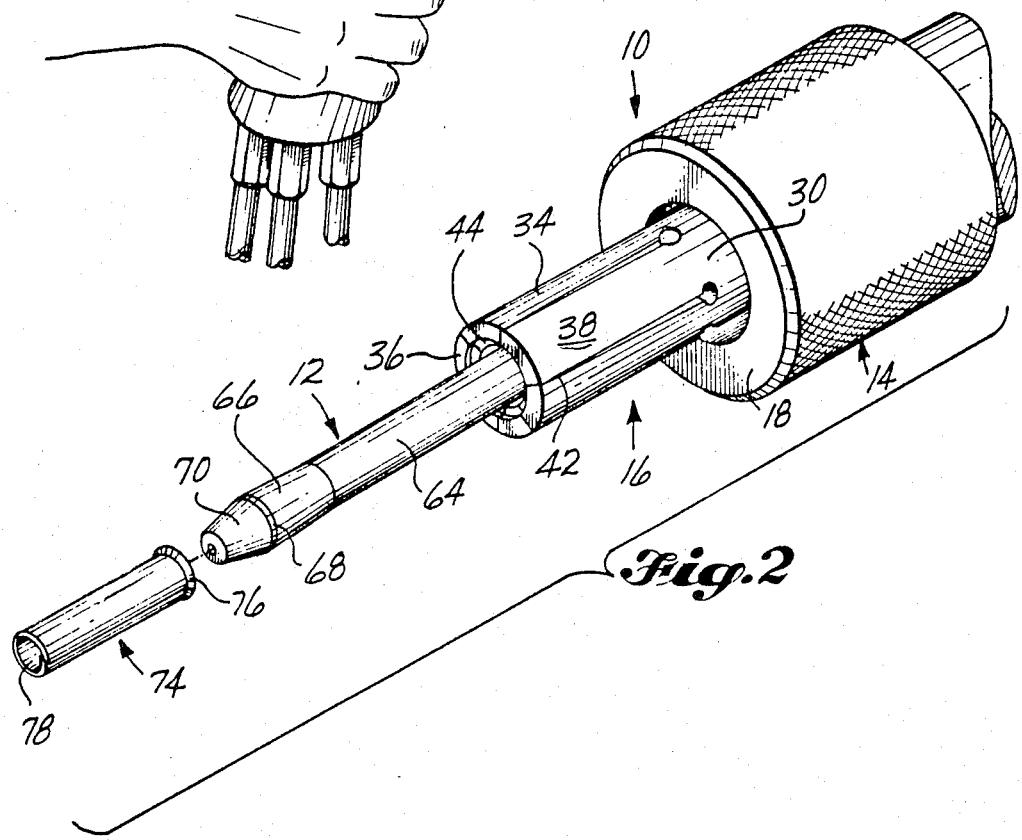
FIG. 2 is an isometric, exploded view illustrating the position of a split, internally lubricated sleeve adapted to be slipped onto a mandrel, where it is to be positioned on the small cylindrical diameter thereof outwardly of the outer end of the extension of the pull gun.
Figure 3:
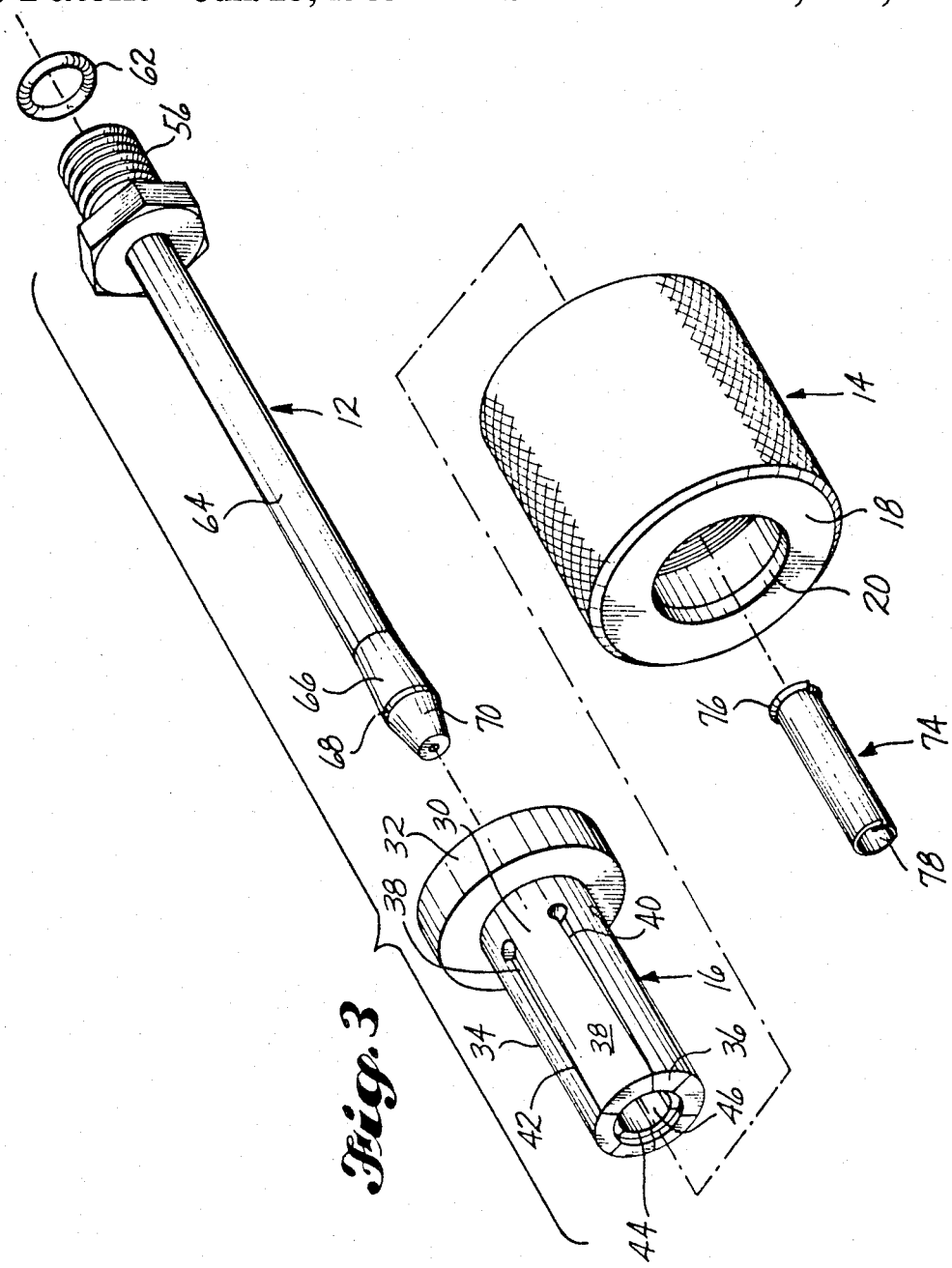
FIG. 3 is an exploded view of a mandrel, an extension of the pull gun according to the invention, an outer cap of the pull gun which secures the extension in the gun, and of an internally lubricated, axially split sleeve having a flared end, the flared end being adapted to fit into the recess at the outer end of the extension when the mandrel and sleeve are being retracted from the workpiece.

Referring again to the drawings, in FIGS. 1–3, devices for prestressing a fastener hole are shown in detail. A pull gun, generally designated as 10, is shown in general outline in FIG. 1 and fragmentarily in FIGS. 2 and 3. The pull gun 10 may be of the type disclosed in U.S. Pat. No. 4,187,708, granted Feb. 12, 1980.

Figure 4:
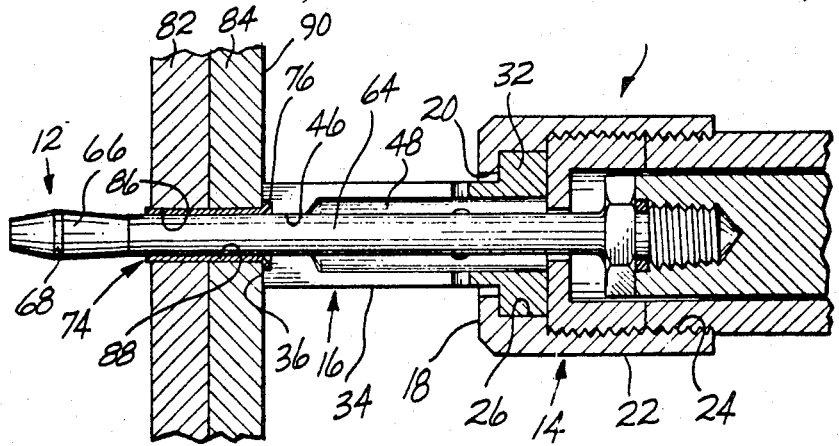
FIG. 4 is the first of three similar longitudinal sectional views illustrating the sequence of the prestressing operation according to the invention, the first view showing the capped nose portion of a pull gun, a portion of a workpiece immediately surrounding the fastener hole to be prestressed, a prestressing sleeve in section, the mandrel in side elevation, and the sleeve retainer secured in the cap of the gun and in abutment with the workpiece and surrounding the cylindrical portion of the mandrel, the first view showing the position of the prestressing tools immediately following the insertion of the mandrel and sleeve into the fastener hole with the flared end of the sleeve in the recess in the end of the retainer.
Figure 6:
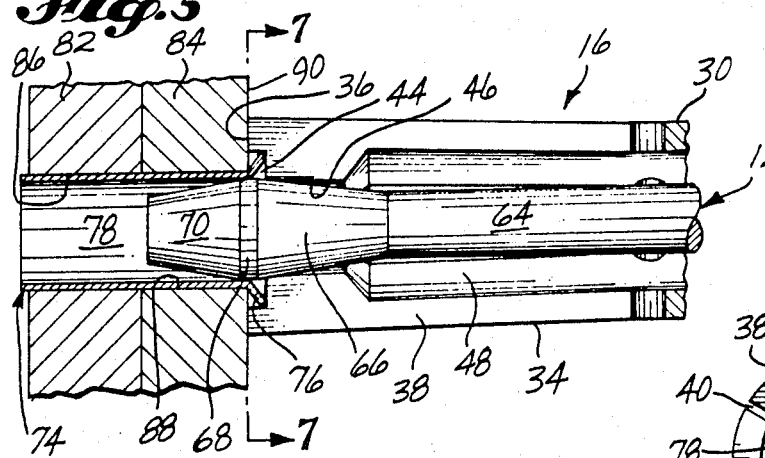
FIG. 6 is a view similar to FIG. 5, illustrating the retraction of the mandrel by the pull gun, the increasing diameter portion and maximum diameter portion of the mandrel having completed the prestressing of the fastener hole.
Figure 7:
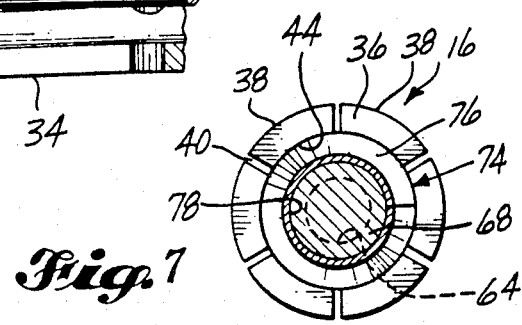
FIG. 7 is an end view of the sleeve retainer, with sleeve and mandrel shown in section, taken along the line 7—7 in FIG. 6.

The pull gun 10 is operated hydraulically to remove a mandrel 12 from an extended, FIGS. 2 and 4, to a retracted position, FIG. 6. The hydraulic operating means is disclosed in detail in U.S. Pat. No. 4,187,708. A generally cylindrical nose cap 14, FIGS. 1–4, is provided adjacent the working end of the pull gun and is adapted to secure a small diameter nose piece, in the form of a generally cylindrical elongated sleeve retainer or extension 16 within the outer end of the gun. The cap 14 has an outer radial end wall 18 formed to include a cylindrical center opening 20. Inwardly of the wall 18 is a cylindrical wall 22 having internal threads 24, terminating forwardly in a small diameter portion 26 forming an inwardly extension of the opening 20. Rearwardly of and radially outwardly of the opening 20 is a flange formed by the wall 18 which is adapted to retain a radially extending circumferentially continuous, cylindrical flange base 32 of the sleeve retainer 16.

As best seen in FIGS. 2 and 3, the flange 32 forms the inner end of the retainer along with an outer continuous circumferential generally cylindrical portion 30. A tapering tubular portion 34 of the nose piece terminates in an outer flat radially directed end 36. The tapering portion 34 is formed of six axially directed spring fingers 38, spaced at their inner ends by adjacent slits or slots 40; the slots narrow outwardly to slits 42 in which axial surfaces of the slots normally make contact with each other to form the slits.

At the outer end, radially inwardly of the wall 36 is an annular recess 44 formed along the outer surfaces of the six fingers 38. Extending inwardly of the recess is small diameter central generally cylindrical passage 46 and inwardly thereof is an enlarged diameter passage 48, FIGS. 4 and 5.

The retainer 16 is made from ultra high strength alloy steel, and in the unhardened state the slots 40 are cut therein so as to have generally axially directed parallel sides, not shown. In preparation for heat treating, an annular clamping device, such as a ring, is positioned around the outer circumference of the extension adjacent the outer end so as to cause the slots adjacent the outer end to be narrowed into slits. The retainer is then heat treated and quenched and when the clamping means is removed, the retainer remains in the form as clamped, and as shown. The fingers 38 are in the form of hardened springs, biased radially inwardly, and adapted to fit tightly on all portions of the mandrel that pass through the small diameter passage portion 46, FIGS. 4 and 5.

The retainer 16 is secured within the gun 10 by a retainer nut 50 having a central passage 52 for the mandrel 12. Inwardly of the nut 50 is an annular wall 54 on which the cap 14 is threadly engaged.

Inner end 56 of the mandrel is threadedly engaged with an adapter 60, secured to a pneumatic piston, not shown. The end 56 is hand tightened into the adapter and is locked in place by an O-ring 62. Extending outwardly of its inner end, the mandrel has a small diameter cylindrical portion 64 on which the fingers 38 of the sleeve retainer are normally tightly but slidably engaged, FIGS. 4 and 5. Outwardly of the portion 64 is an increasing diameter conical portion 66, terminating in a maximum diameter cylindrical portion 68. Tapering outwardly from the maximum diameter cylindrical portion is a decreasing diameter frusto-conidcal end portion 70.

When the mandrel 12 is extended, FIG. 2, a thin axially split, cold-expansion or prestressing steel sleeve 74 is slipped over the outer end of the mandrel onto the small diameter portion 64. The sleeve has an inner flared end 76. The cold-expansion sleeve has a comparable or higher modulus and yield than the material of the workpiece. Interior surface 78 of the sleeve has a solid film lubricant of a commercial type which includes lead oxide, graphite and molybdenum disulfide. The lubricant film is capable of withstanding more than 400,000 psi. See the aforementioned U.S. Pat. No. 3,566,662 and U.S. Pat. No. 3,665,744 for detailed descriptions of the sleeves and a manner of constructing them. The preferred lubricant comprises a molybdenum disulfide, graphite, a binder, a solvent (e.g. toluol) and possibly some lead oxide. As is known to those skilled in the art, the coefficient of friction of this lubricant can be varied by changing the various components.

In FIGS. 4-7, the prestressing operation of the invention is illustrated. Two abutting workpieces 82 and 84, adapted to be secured together by a fastener, have holes 86 and 88, respectively, drilled therethrough. In FIG. 4, the mandrel 12 is in the fully extended position relative to the gun 10 and has been moved through the holes 82 and 84. The sleeve 74 is positioned on the small diameter portion 64 of the mandrel 12. The outer end surface 18 of the nose cap 14 is spaced from the workpiece surface 90 by the retainer 16.

The outer end surface 36 of the retainer 16 is held against the workpiece surface 90 and the flare 76 on the sleeve 74 is engaged in the recess 44 in the end of the retainer. The small diameter surfaces 46 of the fingers 38 are in spring held abutment with the cylindrical surface of the mandrel portion 64 so as to tightly hold the mandrel but be slidably engaged therewith.

Because the prestressing process is a one-sided operation, the split sleeve 74 is installed on the mandrel 12 prior to inserting the mandrel and sleeve into the hole to be expanded and prestressed. A clearance between the sleeve and the wall of the hole is necessary and is equal to approximately 0.003 inch. As may be visualized from FIGS. 4 and 5, to overcome this clearance, it is necessary for the beginning of the tapered section 66 of the mandrel to travel axially, after contact, approximately 0.065 inch before starting to expand the hole 86.

Figure 5:
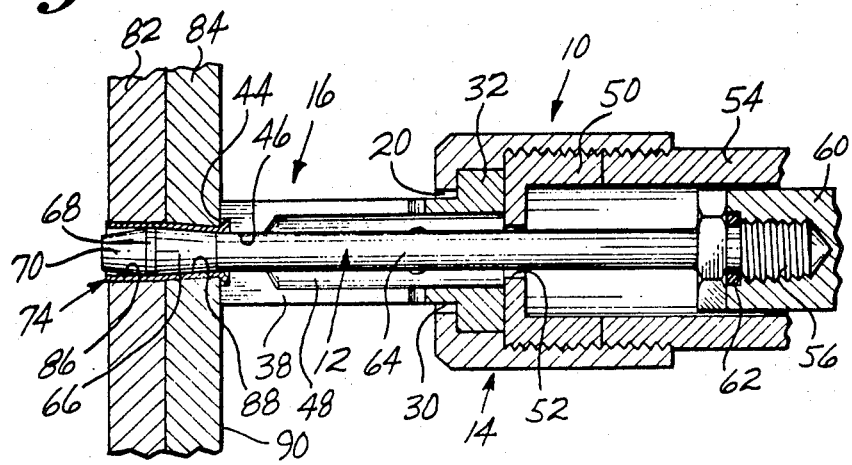
FIG. 5 is a view similar to FIG. 4, illustrating the retraction of the mandrel by the pull gun, the increasing diameter portion and maximum diameter portion of the mandrel in prestressing action of the metal surrounding the fastener hole.

As shown in FIG. 5, the mandrel has been retracted substantially with respect to the workpiece 82, and the increasing diameter portion 66 and the maximum diameter portion 68 have prestressed the area around the hole 86 as indicated by the cold-expansion of the sleeve portion in the hole 86. That is, the metal around the hole 86 is in compression and as the increasing diameter portion 66 moves into the hole 88, expansion of the sleeve and hole 88 has commenced.

As shown in FIG. 6, the prestressing of the hole 88 has been completed when the large diameter portion has been withdrawn from the hole 88.

A considerable pulling force is required to pull the increasing and large diameter portions of the mandrel through the sleeve and cold-expand or prestress the holes. As the increasing diameter portion of the mandrel 66 starts to expand the sleeve in the hole 86, a holding force is exerted on the flared end 76 in the recess 44 in the end of the retainer 16. At this time, the ends 36 of the fingers 38 are in a very substantial pressure engagement with the surface 90 of the workpiece and the fingers 38 are adapted to remain in contact with the smaller diameter portion 64 of the mandrel, FIG. 4, so that the sleeve does not slip between the mandrel and the fingers. This is made possible by the recess arrangement and the spring force of the fingers on the cylindrical portion of the mandrel. As the mandrel is further retracted through the holes 86 and 88, the force on the sleeve in the recess is increased to retain it therein even though the larger diameter portions of the mandrel radially expand the small diameter portion 44 of the fingers. During the expansion, the fingers remain in tight contact with the mandrel, to aid in retaining the sleeve in the recess, FIGS. 6 and 7.

As indicated, a considerable pulling force is required to pull the mandrel through the sleeve and cold-expand or prestress the holes. The maximum diameter cylindrical portion 68 of the mandrel substantially increases the friction and pulling forces around the hole during the prestressing operation. For 3/16 inch to ½ inch diameter holes in various aluminums these forces are in the range of between 2,000 and 9,000 lbs. This same pulling force on the mandrel reacts on the flared end 76 of the sleeve in the recess 44 and as stated, prevents the sleeve from slipping on the mandrel.

Figure 8:
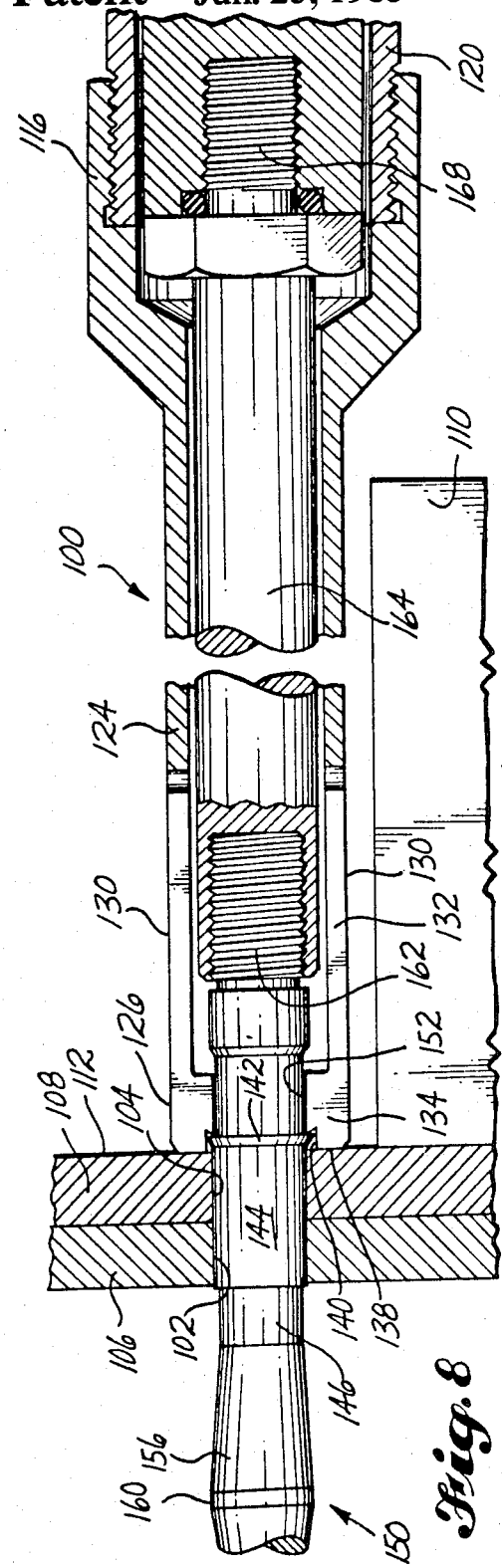
FIG. 8 is a cross-sectional view of a generally cylindrical sleeve retainer made out of a single piece of metal, elongated to provide for the use of a mandrel extension, the latter being secured to the gun.

In FIG. 8, another embodiment of the invention is illustrated. Here, a nose piece or sleeve retainer 100 is made of a single piece of metal of the same type as the nose piece 16 and by the same heat treating process. The nose piece 100 is elongated substantially to prestress the holes, as 102 and 104, in workpieces 106 and 108 respectively, where a protuberance as 110 is fixed on a surface 112 of the workpiece 108.

An inner large diameter end 116 of the retainer is threadedly engaged with an outer end 120 of a pull gun.

In order to use a retainer, as 100, in the space provided adjacent the protuberance 110, or through a drill bushing to be described, the long retainer, shown interrupted, has a relatively small diameter portion 124 extending from adjacent the inner end to an outer end portion 126. The small diameter parts of the retainer are cylindrical and tubular.

The outer end portion is formed of spring fingers 130 of the same type as the fingers 38 in FIGS. 4–7. The fingers 130 are spaced by axially outwardly narrowing slots 132, terminating as slits 134 so that the fingers tend to be in contact along their axial surfaces at the outer end. The outer end of the extension retainer 100 has a flat annular surface 138. Radially inwardly thereof is an annular groove 140 to receive a flared end 142 of a prestressing sleeve 144 within the workpiece holes 102 and 104 and surrounding a small diameter portion 146 of a mandrel 150. Inwardly of the groove 140 the fingers have axial surfaces 152 which are biased into contact with the small diameter portion of the mandrel, forming a small diameter passageway for the tubular retainer 100.

The mandrel 150 functions in the same manner as the mandrel 12 and has a increasing diameter portion 156 and a maximum diameter portion 160. The mandrel is shown in its extended position and because of the length of the retainer 100, it is convenient to secure the inner end 162 of the mandrel in a solid cylindrical mandrel extension 164, the mandrel being threadedly engaged in a tapped bore in the outer end of the extension. The inner end 168 of the extension is threadedly engaged with a pull gun adapter secured to a pneumatic piston, not shown. The prestressing operation using the extension nose piece 100 is the same as that described with respect to FIGS. 4–6.

Figure 9:
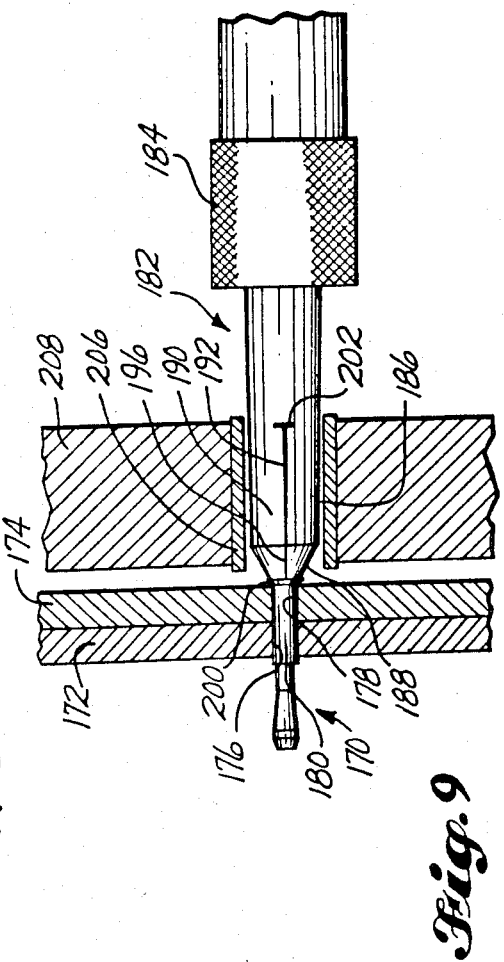
FIG. 9 is a cross-sectional fragmentary view of another embodiment of the invention wherein the sleeve retainer has a conical end to fit into a flared end of a prestressing sleeve so as to avoid direct contact with the workpiece and to avoid marking the same during the prestressing operation.

In FIG. 9, a mandrel 170, workpieces 172, 174, respective holes 176 and 178, and prestressing sleeve 180 are the same as those shown in FIGS. 4–6.

A nose piece retainer 182 is generally cylindrical and has on its inner end a cylindrical flange base, as that shown in FIG. 4 and is secured in a pull gun cap 184, as shown in FIG. 4. The mandrel is similarly secured to an adapter, as 60, which is also secured to a pneumatic piston, not shown.

The sleeve retainer 182 has a tubular passage therethrough in which the mandrel travels during a prestressing operation. A tapering outer end portion 186 of the retainer terminates in a conical outer end 188. The portion 186 is formed of four axially directed spring fingers 190, spaced at their inner ends by narrow axial slots 192 and in the conical portion 188, the slots are narrowed to slits 196 so that the axially directed surfaces of the fingers forming the slits are generally in contact, the spring fingers fitting tightly on the mandrel. As shown, the outer portion of the conical end is adapted to be fitted within flared end 200 on the sleeve.

The retainer 182 is formed with narrow transverse slots 202 at the inner end of the slots 192. Retainer 182 is made of the same material as the retainer 16 and is formed by the same type of clamping and heat treating operation.

The sleeve retainer 182 is made with a relatively small outside diameter relative to the prior art retainers, having their ends adjacent or within the large diameter pull guns. The small outside diameter of the retainer 182 is particularly adapted for use in prestressing through a drill bushing 206 in a drill fixture 208. Such drill fixtures are typically positioned and temporarily fixed in front of a workpiece in which holes are to be drilled and then prestressed by cold expansion. In the drilling operation, the fixtures are used to guide drills through the drill bushings so as to position all of the holes in the correct location.

Because reaming is performed after the cold expansion of the holes, use of a sleeve retainer in the form of retainers 16, 100 and 182 allows the manufacturer to leave the drill fixture in position after the drilling, for the cold expansion portion of the operation, and thus enabling final reaming operation to be made through the drill bushing holes which remain in register with the original holes as drilled. This is an important advantage of the three types of sleeve retainers described and disclosed herein and is in addition to the advantage illustrated in FIG. 8 in regard to protuberances extending from the workpiece.

The conical end 188 on the nose piece retainer 182, inside the flare of the prestressing sleeve transfers the load during the prestressing operation directly through the periphery of the hole 178. In the prestressing operation, the conical end in the flare of the sleeve also provides coining on the edge of the hole.

This embodiment provides the additional advantage of not leaving any circular marks on the workpiece, as may be left by the outer flat ends 36 and 138 of the retainers 16 and 100, respectively. The flat ends have a high load transfer through a small cylindrical area so as to tend to leave some form of a mark on the workpiece. The aircraft industry prefers not to have such marks on the outer skin of an aircraft, as they tend to suggest that the aircraft may have been scarred or the surface somewhat damaged.

From the foregoing, it is clear that the relatively small outer diameters of the three sleeve retainer embodiments, according to the present invention, provide considerable additional advantages in prestressing of fastener holes over the prior art devices.

The invention and its attendant advantages will be understood from the foregoing description and it will be apparent that various changes may be made in the form, construction and arrangements of the parts of the invention without departing from the spirit or scope thereof or sacrificing its material advantages, the arrangements hereinbefore described being merely by way of example. We do not wish to be restricted to the specific forms shown or uses mentioned except as defined in the accompanying claims.

We claim:

1. For use as a pull gun extension and sleeve retainer, wherein said pull gun is adapted for pulling a mandrel axially through a one piece prestressing sleeve within a fastener hole in a workpiece, so that varied diameter portions of the mandrel exert expansion forces on the sleeve, to cause the sleeve to be expanded radially and prestress the metal around the fastener hole, and in that manner improve fatigue properties of the metal; said extension and sleeve retainer comprising:

an elongated generally tubular member having an inner and an outer end, and a generally central passageway therethrough;

means on the inner end for securing the member to the pull gun;

a multiple of annularly spaced, axially directed alternate splits and fingers extending axially inwardly from the outer end to positions outwardly of the inner end;

adjacent fingers normally being closely adjacent along axially directed surfaces along the splits at their outer ends;

the passageway being formed along inner annular surfaces of the fingers which are configured to be radially engaged at their outer ends with a mandrel when the mandrel extends therethrough and when it is being retracted through the sleeve in the fastener hole; and axially and radially directed means formed adjacent the outer end extending around the passageway to engage the end of the sleeve to axially retain it in a fastener hole when the mandrel is being retracted through the sleeve and to prevent the sleeve from entering the passageway.

2. The invention according to claim 1 in which:

said means formed adjacent is an annular recess in the outer end.

3. The invention according to claim 1 in which:

said means formed adjacent are conical surfaces on the fingers tapering toward the outer ends.

4. The invention according to claim 1 in which:

the passageway surfaces adjacent the outer end are adapted to fit tightly but slidably on all parts of the mandrel to prevent the sleeve from moving along the mandrel when the mandrel is being retracted through the sleeve.

5. The invention according to claim 1 in which:

said member is made of a heat-treated ultra high strength alloy steel;

the fingers being set during heat treating to normally have the axial surfaces along the splits closely adjacent at the outer end, the splits adjacent the outer end being normally reduced to narrow slits.

6. The invention according to claim 1 in which:

said member is made of a single piece of heat-treated ultra high strength steel.

7. An elongated nose piece for a pull gun of a type which is used for pulling a mandrel axially through a one piece prestressing sleeve located within a fastener hole in a workpiece, said mandrel having an inner small diameter portion and endwise outwardly thereof having an increasing diameter working portion, whereby pull gun movement of the increasing diameter working portion of the mandrel through the sleeve will cause the sleeve to be expanded in the radial direction and apply prestressing forces to the workpiece around the fastener hole, to in that manner improve fatigue properties of the metal, said nose piece comprising:

an elongated, generally tubular member having a central passageway through which the mandrel travels axially towards and away from the pull gun;

said tubular member having an external diameter substantially smaller than that of a pull gun in which it is used;

said tubular member having a circumferentially continuous inner portion, an elongated axially slotted main body portion extending axially outwardly from said inner portion;

said main body portion having an annular outer end adapted to engage the sleeve adjacent a fastener hole, axially and radially directed means in the outer end to axially retain the engaged sleeve in a fastener hole when the mandrel is being pulled through the sleeve and the fastener hole and to prevent the sleeve from entering the passageway;

said passageway having a normal diameter at said outer end which is substantially equal to the inner small diameter of the mandrel; and said axially slotted outer portion comprising axially elongated tubular segments which are separated by axial slots, said segments normally angling radially inwardly as they extend axially outwardly from said inner portion, and at their outer ends being closed adjacent at their edges, and said tubular segments being constructed from a material which allows them to function as leaf springs, so that during retraction of the mandrel into the nose piece, the segments will deflect radially outwardly and enlarge the central passageway so that it can accommodate the increasing diameter working portion of the mandrel, and following a movement of the increasing diameter working portion out from the nose piece, the said segments will spring back into their normal positions.

* * * * *